(12) United States Patent
Jeong et al.

(10) Patent No.: US 9,877,258 B2
(45) Date of Patent: Jan. 23, 2018

(54) METHOD AND DEVICE FOR TRANSFERRING DATA TRAFFIC

(71) Applicant: Samsung Electronics Co., Ltd., Gyeonggi-do (KR)

(72) Inventors: Sang Soo Jeong, Gyeonggi-do (KR); Erik Guttman, Waibstadt (DE)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 93 days.

(21) Appl. No.: 14/652,398

(22) PCT Filed: Dec. 13, 2013

(86) PCT No.: PCT/KR2013/011594
§ 371 (c)(1),
(2) Date: Jun. 15, 2015

(87) PCT Pub. No.: WO2014/092506
PCT Pub. Date: Jun. 19, 2014

(65) Prior Publication Data
US 2015/0334628 A1    Nov. 19, 2015

(30) Foreign Application Priority Data

Dec. 13, 2012 (KR) .................. 10-2012-0145544
Jul. 3, 2013 (KR) .................. 10-2013-0078009

(51) Int. Cl.
*H04W 4/00* (2009.01)
*H04W 40/02* (2009.01)
(Continued)

(52) U.S. Cl.
CPC ......... *H04W 40/02* (2013.01); *H04L 12/4625* (2013.01); *H04L 12/6418* (2013.01);
(Continued)

(58) Field of Classification Search
CPC ....... H04W 40/02; H04W 8/26; H04W 88/16; H04L 12/4625; H04L 12/6418; H04L 45/74; H04L 61/1511
See application file for complete search history.

(56) References Cited

U.S. PATENT DOCUMENTS

2011/0096750 A1* 4/2011 Velandy ................ H04W 48/17
370/331
2012/0220330 A1* 8/2012 Goldner .............. H04L 12/1407
455/517

(Continued)

FOREIGN PATENT DOCUMENTS

CN    101330720 A    12/2008
CN    101369939 A    2/2009
(Continued)

OTHER PUBLICATIONS

International Search Report dated Mar. 20, 2014 in connection with International Patent Application No. PCT/KR2013/011594, 5 pages.
(Continued)

*Primary Examiner* — Afshawn Towfighi

(57) ABSTRACT

A method for transmitting and receiving a signal in a traffic detection function (TDF) of a mobile communication system, according to one embodiment of the present specification, comprises the steps of: receiving, from a policy server, a policy that includes address information of packet data network (PDN) gateways (PGWs) respectively corresponding to one or more PDNs; receiving a message that includes a data packet from one PDN among the one or more PDNs; and transmitting the received packet to the address of the corresponding PGW on the basis of the policy information. According to one embodiment of the present specification, it is possible to provide a device and a method capable of providing a charging capability of an application level by
(Continued)

providing a method and a device for transferring classified traffic in an implicit selective manner.

16 Claims, 12 Drawing Sheets

(51) Int. Cl.
*H04W 88/16* (2009.01)
*H04L 12/741* (2013.01)
*H04L 12/64* (2006.01)
*H04L 12/46* (2006.01)
*H04L 29/12* (2006.01)

(52) U.S. Cl.
CPC .............. *H04L 45/74* (2013.01); *H04W 88/16* (2013.01); *H04L 61/1511* (2013.01)

(56) References Cited

U.S. PATENT DOCUMENTS

| | | |
|---|---|---|
| 2012/0246352 A1 | 9/2012 | Lim |
| 2012/0250658 A1 | 10/2012 | Eisl et al. |
| 2014/0023029 A1* | 1/2014 | Yokota .................. H04W 48/20 370/329 |
| 2014/0071969 A1* | 3/2014 | Roeland .............. H04W 76/026 370/338 |

FOREIGN PATENT DOCUMENTS

| | | |
|---|---|---|
| CN | 101420792 A | 4/2009 |
| CN | 101547142 A | 9/2009 |
| JP | WO2012132010 | * 10/2012 |
| KR | 10-2011-0067874 | 6/2011 |
| KR | 10-2011-0094132 | 8/2011 |
| KR | 10-2012-0120308 | 11/2012 |

OTHER PUBLICATIONS

Written Opinion of International Searching Authority dated Mar. 20, 2014 in connection with International Patent Application No. PCT/KR2013/011594, 7 pages.
Partial Supplementary European Search Report dated Jul. 6, 2016 in connection with European Application No. 13862571.0, 5 pages.
European Patent Office, "Supplementary European Search Report," Application No. 13862571.0-1862, Nov. 3, 2016, 14 pages, publisher EPO, Munich, Germany.
Cisco et al: "Multiple APN Support—Approaches and Considerations," TD S2-123004, 3GPP TSG SA WG2 Meeting #92, 9-13, Barcelona, Spain, Jul. 3, 2012, 5 pages.
3GPP TR 23.852 V1.2.0, "3rd Generation Partnership Peoject; Technical Specification Group Services and System Aspects," Study on S2a Mobility based on GTP & WLAN access to EPC (SaMOG), Stage 2, (Release 12), 2011, pp. 1-63, publisher 3GPP Organizational Partners (ARIB, ATIS, CCSA, ETSI, TIA, TTC), Sophia Antipolis Valbonne—France.
Foreign Communication from Related Counterpart Application; Chinese Patent Application No. 201380065528.0; Notification of the First Office Action dated Oct. 23, 2017; 14 pages.

* cited by examiner

METHOD AND DEVICE FOR TRANSFERRING DATA TRAFFIC

CROSS-REFERENCE TO RELATED APPLICATION(S)

The present application claims priority under 35 U.S.C. § 365 to International Patent Application No. PCT/KR2013/011594 filed Dec. 13, 2013, entitled "METHOD AND DEVICE FOR TRANSFERRING DATA TRAFFIC". International Patent Application No. PCT/KR2013/011594 claims priority under 35 U.S.C. § 365 and/or 35 U.S.C. § 119(a) to Korean Patent Application Nos. 10-2012-0145544 filed Dec. 13, 2012, and 10-2013-0078009 filed Jul. 3, 2013, and which are incorporated herein by reference into the present disclosure as if fully set forth herein.

TECHNICAL FIELD

An embodiment of the present specification relates to a data traffic transfer method and apparatus for use in a communication system and, in particular, to a method and apparatus for transferring classified traffics selectively in an implicit manner.

BACKGROUND ART

Since Release 11, the 3GPP architecture includes Traffic Detection Function (TDF). The TDF monitors application traffic flows. This is accomplished by means of a Packet Data Network Gateway (P-GW). However, an important arrangement option is placing the TDF obviously as shown in FIG. 1.

FIG. 1 is a diagram illustrating an arrangement of a TDF in a communication system.

Referring to FIG. 1, the communication system may include an operatorcontrol network 110 and a Packet Data Network (PDN) 170.

The operator control network 110 may include a Policy Charging Resource Function (PCRF) 120, a PDN Gateway (PDN GW) 130, a Traffic Detection Function (TDF), 140, and a User Equipment (UE) 150. The communication system may further include a Policy Charging Enforcement Function (PCEF). The data communication between the PDN 170 and the UE 150 may generate PP traffic 160.

In the PCEF, the TDF 140 and an Application Detection Function (ADC) are optional entities for interpreting ADC rules transmitted by the PCRF. Unless the application detection function is required in the PCEF, detailed description thereof is not discussed herein.

The ADC rules are used to identify applications by means of identifiers (IDs) and, when they are identified, the TDF 140 detects the operations performed thereby. What it means that the TDF 140 detects applications is not generalized.

The TDF 140 is arranged on the routing path between the PDN 170 and the PND GW 130 in the operator control network 110.

Without detecting applications, the PDN GW 130 can support the function called PCEF which detects service level IP flows. The PCC rules from the PCRF 120 may be used to control how to change the service flows and QoS policies applied in the 3GPP network (and UE 150). For example, the traffic may be processed on the best effort basis (i.e. using default traffic processing. This means use of the default bearer with QCI=9 in EPS) without service flows (order) policy.

Since the interests in sorting the application data streams into predetermined charged operation policies as well as classifying appropriate QoSs potentially and, otherwise, classifying the traffics that can be processed as unclassified 'best effort' traffic are increasing, it is important to detect applications in the 3GPP system. Actually, some application data streams may be identified as those transmitted on 'more optimal' (i.e. smaller) radio resource.

The task for providing the charging capabilities at the application level is on the progress, and there is a need of a more efficient solution.

DISCLOSURE

Technical Problem

The present specification has been proposed in an effort to solve the above problems and aims to provide a data traffic transfer method and apparatus that is capable of supporting application-level charging capabilities. Also, the present specification aims to provide a data traffic transfer method and apparatus that is capable of transferring classified traffics selectively in an implicit manner.

Technical Solution

In accordance with an aspect of the present specification, a signal transmission/reception method of an apparatus of executing Traffic Detection Function (TDF) in a mobile communication system includes receiving a policy including address information of a Packet Data Network Gateway (P-GW) which corresponds to at least one Packet Data Network(PDN) respectively from a policy server, receiving a message including a data packet from one of the at least PDN, and transmitting the received packet to an address of a corresponding PGW based on the policy information.

In accordance with another aspect of the present specification, a signal transmission/reception method of a Packet Data Network Gateway (PDN GW, P-GW) of a mobile communication system includes receiving a policy including address information of the P-GW which corresponds to at least one PDN from a policy server and receiving a packet using a P-GW address which is determined by a traffic detection function based on the policy information.

In accordance with another aspect of the present specification, a signal transmission/reception method of a terminal in a mobile communication system includes receiving filter information including reception addresses information corresponding to a Packet Data Network (PDN) from an Access Point (AP), receiving a message including a packet through one of reception addresses from the AP, and determining the PDN to which the packet is transmitted based on the filter information.

In accordance with still another aspect of the present specification, a signal transmission/reception method of an Access Point (AP) in a mobile communication system includes transmitting filter information including reception address information corresponding to a Packet Data Network (PDN) to a terminal, transmitting a message including a packet to one of the addresses of the terminal, and determining, at the terminal, the PDN to which the packet is transmitted based on the filter information.

Advantageous Effects

The method and apparatus of transferring the classified traffics selectively in an implicit manner according to the present specification is advantageous in tenns of supporting the charging capabilities at the application level.

MODE FOR INVENTION

Figure 1:
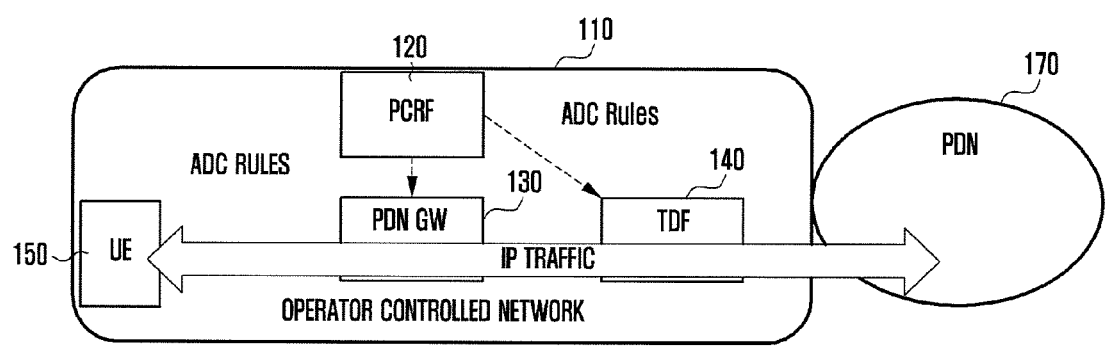
FIG. 1 is a diagram illustrating an arrangement of a TDF in a communication system.

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

In the following embodiment, each of the UE, evolved Node B (eNB), S-GW, PCRF, P-GW, and TDF may include a transceiver for communicating data with other entities and a controller for processing data being transmitted and received by the transceiver and controlling the transceiver. According to an embodiment, the transceiver may include a transmitter for transmitting data and a receiver for receiving data.

Exemplary embodiments of the present invention are described with reference to the accompanying drawings in detail hereinafter.

The meaning that the TDF detects an application in FIG. 1 may be interpreted as follows. If the TDF detects an application, this may include at least one of (a) reporting the start/end of the application to the PCRF 120, (b) dropping or redirecting the traffic, (c) managing records (subscription property, subscriber location, and application for usage monitoring), and (d) notifying other nodes of the information on the detected application. In an embodiment, the PDN GW 130 may be located at the same communication node as the TDF 140.

Figure 2:
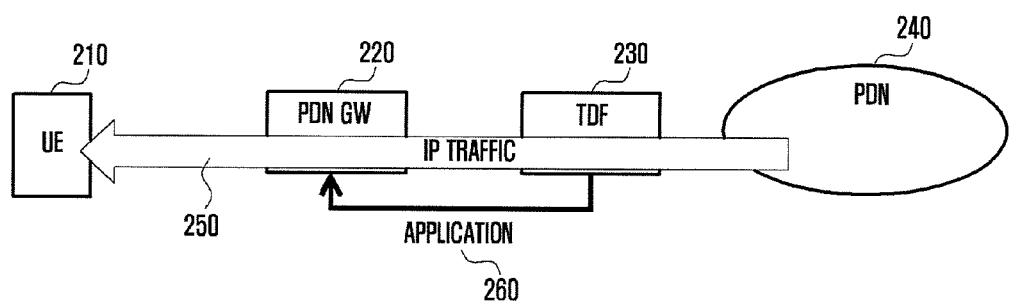
FIG. 2 is a diagram illustrating application classification from a TDF to a PDN GW.

FIG. 2 is a diagram illustrating application classification from a TDF to a PDN GW.

Referring to FIG. 2, the communication system may include a UE 210, a PDN GW 220, a TDF 230, and a PDN 240 that are communicating data to relay IP traffic 250 from the PDN 240 to the UE 210.

One of the objects of this embodiment is to provide a means with which the PDN GW 220 can classify application data flow 260. This makes it possible for the TDF 230 to detect applications and classify the downlink traffic (from the PDN 240 to the UE 220) while the PDN GW 220 executes a specific rule based on the handling of the IP traffic 250.

Figure 3:
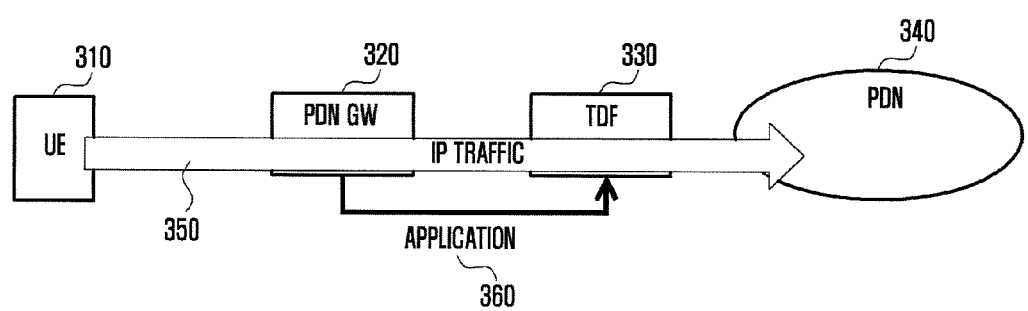
FIG. 3 is a diagram illustrating application classification from a PDN GW to a TDF.

FIG. 3 is a diagram illustrating application classification from a PDN GW to a TDF.

Referring to FIG. 3, the communication system may include a UE 310, a PDN GW 320, a TDF 330, and a PDN 340 that are communicating data to relay IP traffic from the HE 310 to the PDN 340.

The PDN GW 320 classifies the application data flows of the uplink traffic and sends this information to the TDF 330 as denoted by reference number 360. This makes it possible for the TDF 330 to continue performing various functions with the PDN GW 320. The various functions may include at least one of reporting, enforcement, and record keeping.

Throughout the embodiment, the classification may be made by IP datagram.

Figure 4:
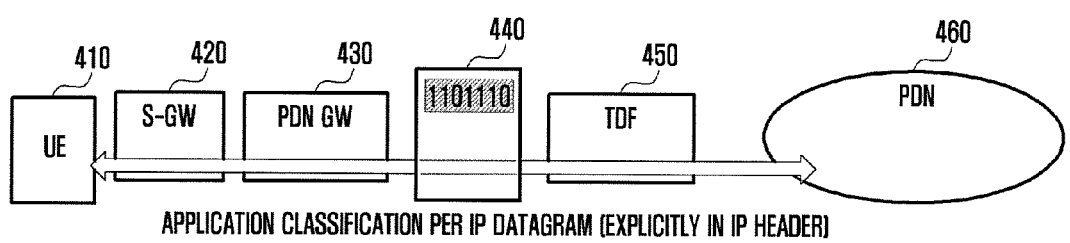
FIG. 4 is a diagram illustrating an approach using Differentiated Services Code Point (DSCP) marking in a communication system.

FIG. 4 is a diagram illustrating an approach using Differentiated Services Code Point (DSCP) marking in a communication system.

Referring to FIG. 4, the communication system may include a UE 410, a Serving Gateway (S-GW) 420, a PDN GW 430, a TDF 450, and a PDN 460.

The approach of using the DSCP marking has been proposed in the course of developing SIRIG feature for TDF 450 adopting the DSCP marking to the IP packets mapped to the application classes. These markings may be standardized or allocated dynamically (on Rx and Gx). That is, the TDF 450 may mark an IP packet 440 with a specific DSCP value according to the application class it has detected and sends the packet to the P-GW 430. The DSCP-based method may cause complication to the original meaning of the marking and be restricted in numbering space for the DSCP marking code points, resulting in instability of mappings.

Another issue is that the DSCP code points may be transmitted by the UE 410 in uplink and they (if it is non-standard) may be transmitted between HPLMN and VPLMN (to the S-GW 420 located there in a roaming scenario). Finally, if the DSCP markings are not transmitted from the S-GW 420 to a BBERF, the support of PMIP on S5/S8 becomes complicated and the solution may not be considered appropriately.

Figure 5:
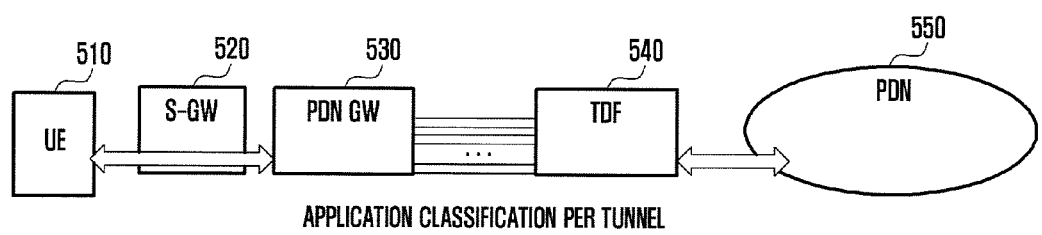
FIG. 5 is a diagram illustrating configuration of a tunnel between a PDN GW and a TDF per application class.

FIG. 5 is a diagram illustrating configuration of a tunnel between a PDN GW and a TDF per application class.

Referring to FIG. 5, the communication system may include a UE 510, a Serving Gateway (S-GW) 520, a PDN GW 530, a TDF 540, and a PDN 550.

In an embodiment, a means for generating some types of tunnels between the TDF 540 and the PDN GW 530 may be standardized for required application classes. That is, if the P-GW 530 has to receive the application classes detected by the TDF 540, a tunnel is generated between the P-GW 530 and the TDF 540 for exchanging the information on the class of the detected application. This tunnel solution has drawbacks of high complexity and signaling load for establishing and releasing the tunnel.

The embodiments of the present specification are applicable to the network configuration of using the PMIP-based S5/S8 as well as GTP-based network configuration. If the PDN GW 530 knows the application class (e.g. GTP-based network configuration), this is helpful only when the PDN GW (PCEF) 530 is an entity of the core network which is necessary for enforcing (or activating enforcement of) the operations based on that information. If the PMIP-based S5/S8 is established, the application class information may be used by the S-GW (BBFR) 520 for performing the operations based thereon.

Figure 6A:
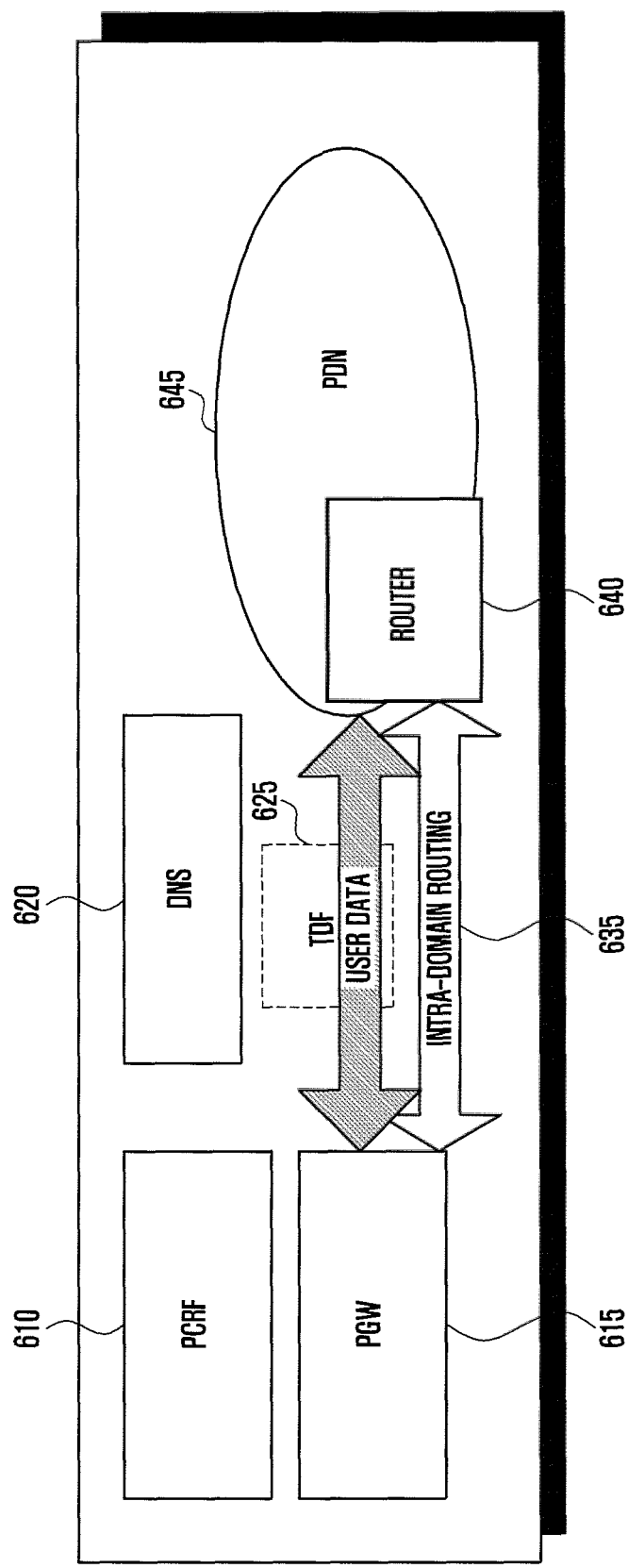
FIGS. 6A and 6B are diagrams illustrating Transparent versus Routing Function in a communication system.
Figure 6B:
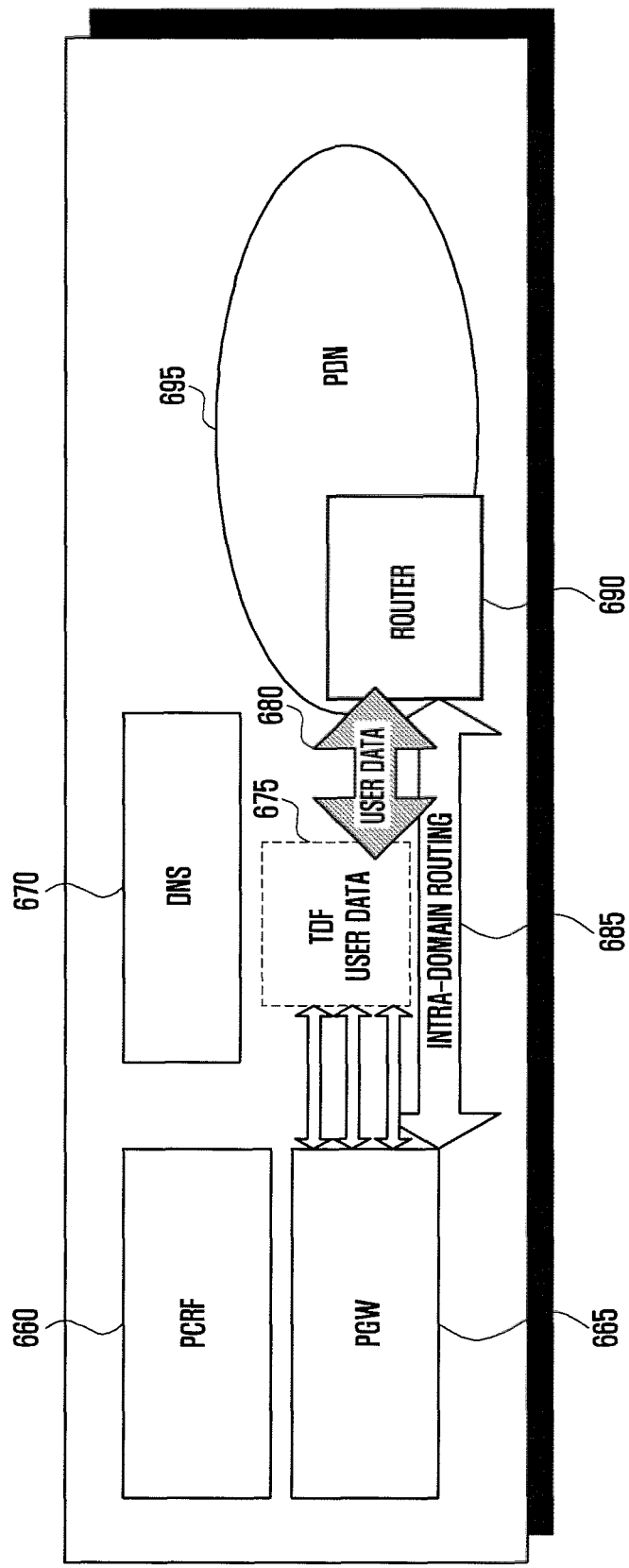

FIGS. 6A and 6B are diagrams illustrating Transparent versus Routing Function in a communication system.

Referring to FIGS. 6A and 6B, the communication system according to an embodiment may include a PCRF 610 (660), a P-GW 615 (665), a DNS 620 (670), a TDF 625 (675), a router 640 (690), and a PDN 645 (695). The method being described hereinafter with reference to FIG. 6A is applicable to FIG. 6B.

In an embodiment, the TDF 625 may be a transparent function on the transfer path. Instead, the TDF 625 may operate as a router and transfer data through virtual P-GW interfaces. The virtual P-GW interfaces may be used to express the application class flows implicitly.

In an embodiment, the added state may not exist on both ends of the communication link.

If the router cannot use the other points with the exception of the entities on TNL, it may use private addresses or non-advertised prefixes.

The TDF 625 may determine a destination (in this embodiment, P-GW 615) of the downlink traffic. According to an embodiment, the TDF 625 has to determine the destination of the downlink traffic.

1) The TDF 625 may be using the DNS 620 already to select the PCRF 610. Additional P-GW interfaces may be selected by using the DNS 620.

2) Alternatively, the PDN GW 615 may advertise these interfaces to the TDF 625 along with the sufficient information by means of a routing protocol (routing advertisement).

3) The routing information may be added to the ADC rules, and virtual PDN GW identifiers may be given for respective application classes (e.g. DNS name). In detail, the PCRF 610 may configure an ADC rule to the TDF 625 for application detection and operations thereof, and the rule may include the detected application class and a virtual P-GW identifier or DNS name corresponding thereto. If a predetermined application is detected, the TDF 625 transmits the corresponding IP packet to the virtual P-GW address based on the mapping information. The P-GW 615 may determine the application class of the corresponding IP packet based on the received virtual P-GW address. The mapping information between the virtual P-GW address and the detected application class may be preconfigured on the P-GW 615 or configured as a part of the PCC rule under the control of the PCRF 610.

In uplink, the TDF 625 may receive the IP packets using the virtual TDF addresses identified by application class. The PDN GW 615 may select a routing path such that the 'next hop router' toward the destination becomes the corresponding TTDF address. The suitable destination may be configured by the PDN GW 615 or acquired from the configuration received through a Gx for the IP CAN session for an individual subscriber.

In order to support the PMIP-based S5/S8, the S-GW may support the classified virtual addresses. The DNS resolution algorithm for selecting an S-GW may be modified so as to include application classification.

Figure 7:
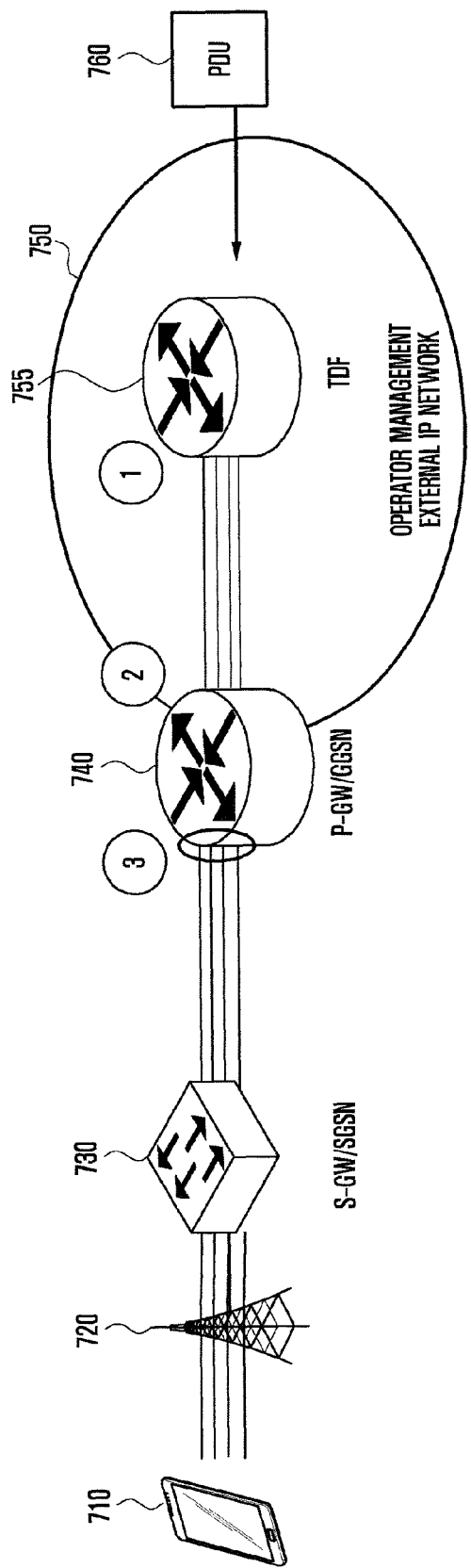
FIG. 7 is a diagram illustrating a communication system for explaining the GTP-based S5/S8 downlink.

FIG. 7 is a diagram illustrating a communication system for explaining the GTP-based S5/S8 downlink.

In the embodiment of FIG. 7, the communication system includes a UE 710, an eNB 720, an S-GW/SGSN 730, a P-GW/GGSN 740, and a user management external IP network 750. The user management external IP network 750 may include the TDF 755. The communication system may route the PDN 760.

In an embodiment, the throughput is recorded with 'virtual interface' or 'virtual address'. An alternative transport layer PORT may be used for the same address.

1. The TDF 755 may select one of a plurality of P-GW/GGSN addresses for routing the PDU 760. According to an embodiment, the TDF 755 may select one of the plural virtual P-GW/GGSN addresses based on the network management policy or the ADC rule received from a PCRF.

2. The P-GW/GGSN 740 may classify the application of the PDU 760 implicitly based on the virtual address at which the packet is received.

3. The P-GW/GGSN 740 may perform application-specific process on the PDU 760. The application-specific process may be determined depending on the network management policy. According to an embodiment, the application-specific process may be determined by the P-GW/GGSN 740 in association with the PDU 760 or selected based on the PCC rule provided by the PCRF.

According to an embodiment, it is possible to perform at least one of adding the charging function, marking the service class identifier field of the GTP-U header with the application class information received from the TDF, and binding to a specific bearer.

Figure 8:
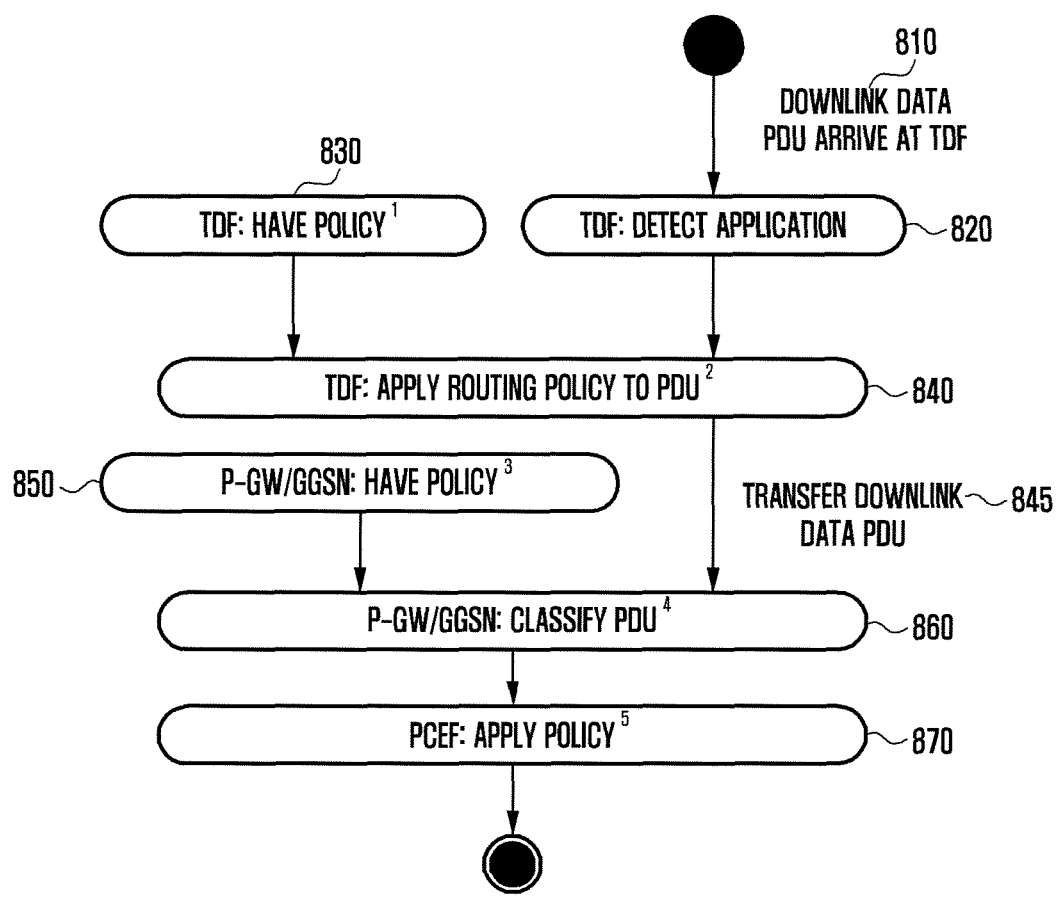
FIG. 8 is a diagram illustrating a data processing method according to an embodiment.

FIG. 8 is a diagram illustrating a data processing method according to an embodiment.

A downlink data Packet Data Unit (PDU) may arrive at the TDF at step 810. The TDF may detect an application based on the received downlink data PDU at step 820.

The TDF may check that it has a policy at step 830. The TDF may have a rule preconfigured statically or configured based on the ADC rule received through the Sy. According to an embodiment, the TDF may detect an application associated with the downlink data PDU based on the above policy. Steps 820 and 830 may be performed as a single step.

The TDF may transfer the received downlink data PDU to the virtual P-GW address mapped according to the detected application class at step 840. That is, the TDF may apply the routing policy to the received downlink data PDU at step 840. The routing policy may be based on the policy determined at step 830. The TDF may use the routing policy to transfer the application traffic to the correct P-GW or GGSN.

The TDF may forward the received downlink data PDU at step 845. At this time, the TDF may select the address of the P-GW to forward the PDU according to the detected application class.

The P-GW/GGSN may check the policy statically or based on the IP-CAN session rule received through the Gx at step 850. The policy may be preconfigured by the operator or entered selectively.

The P-GW/GGSN can classify the application to which the PDU belongs because the virtual GW address to which the PDU is received is application class-specific.

The PCEF may apply the policy at step 870. According to an embodiment, step 870 is performed in such a way that the PCEF or GW performs charging, bearer routing-based policy enforcement, and marking the GTP-U header of the packet with the service class identifier.

Figure 9:
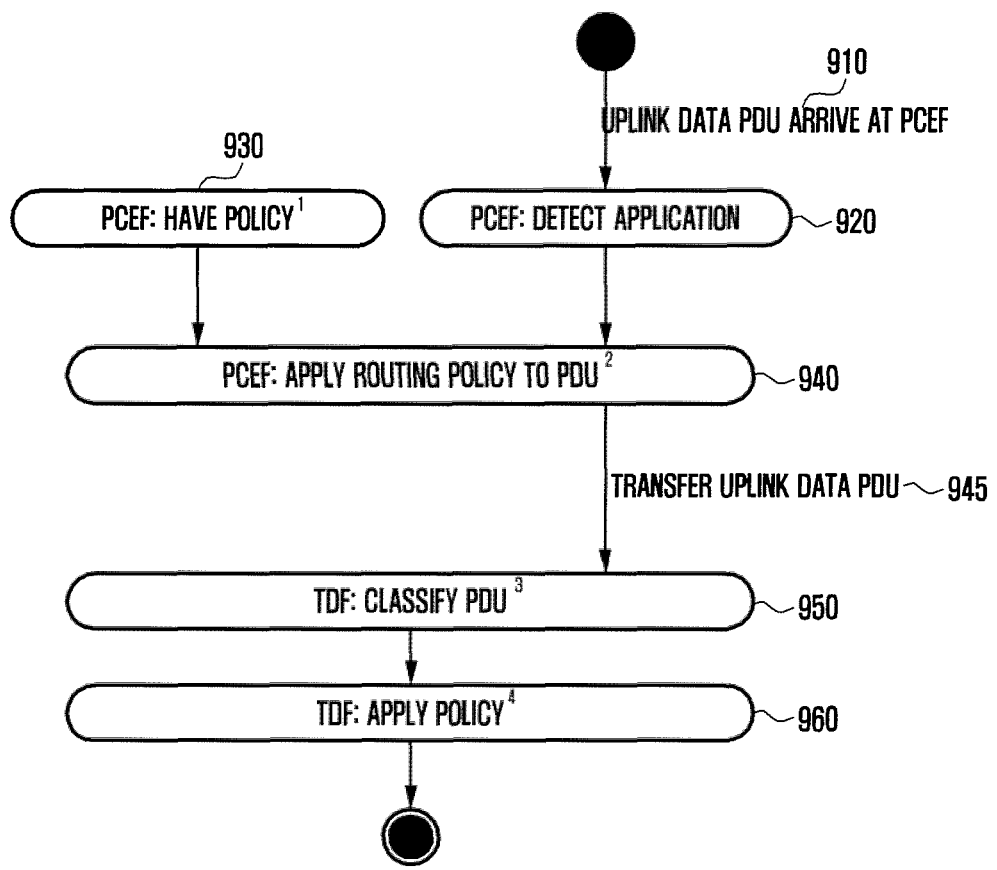
FIG. 9 is a diagram illustrating GTP-based S5/S8 uplink according to an embodiment.

FIG. 9 is a diagram illustrating GTP-based S5/S8 uplink according to an embodiment.

Referring to FIG. 9, an uplink data PDU may arrive at the PCEF at step 910. The PCEF may detect the application based on the received uplink data PDU at step 920.

The PCEF may check that it has a policy at step 930. The policy may be associated with the IP-CAN session or configured statically. The policy may be preconfigured by the operator or determined selectively depending on the communication condition. Steps 920 and 930 may be performed as a single step.

The PCEF may determine uplink routing policies for the PDU such that the PDU arrives at the TDF using the virtual TDF (specific TDF address) for the classified data at step 940.

The uplink data PDU may be forwarded at step 945.

The TDF classifies the PDU to determine the application type and available application class at step 950. Upon receipt of the PDU from the PCEF through a specific virtual TDF address, it is possible to determine the class applied by the PCEF implicitly. Although the TDF determines to use a different application class, it may select the same policy as the PCEF.

The TDF applies the policy associated with the ADC rule at step 960. Notice: the current ADC rule does not request for application class-based policy operations. The behavior based on the application class is just a part of the SIRG and, at this time, defined to the PCEF for downlink packets. This behavior is not controlled by the ADC rules or the PCC rules. This may be configured by the PCEF in a proprietary manner.

The procedure of FIG. 9 may be useful potentially in the case where the PCEF classifies the traffic and the TDF is arranged according to an embodiment. This uplink procedure may require for the TDF to recognize the classification performed by the PCEF.

Figure 10:
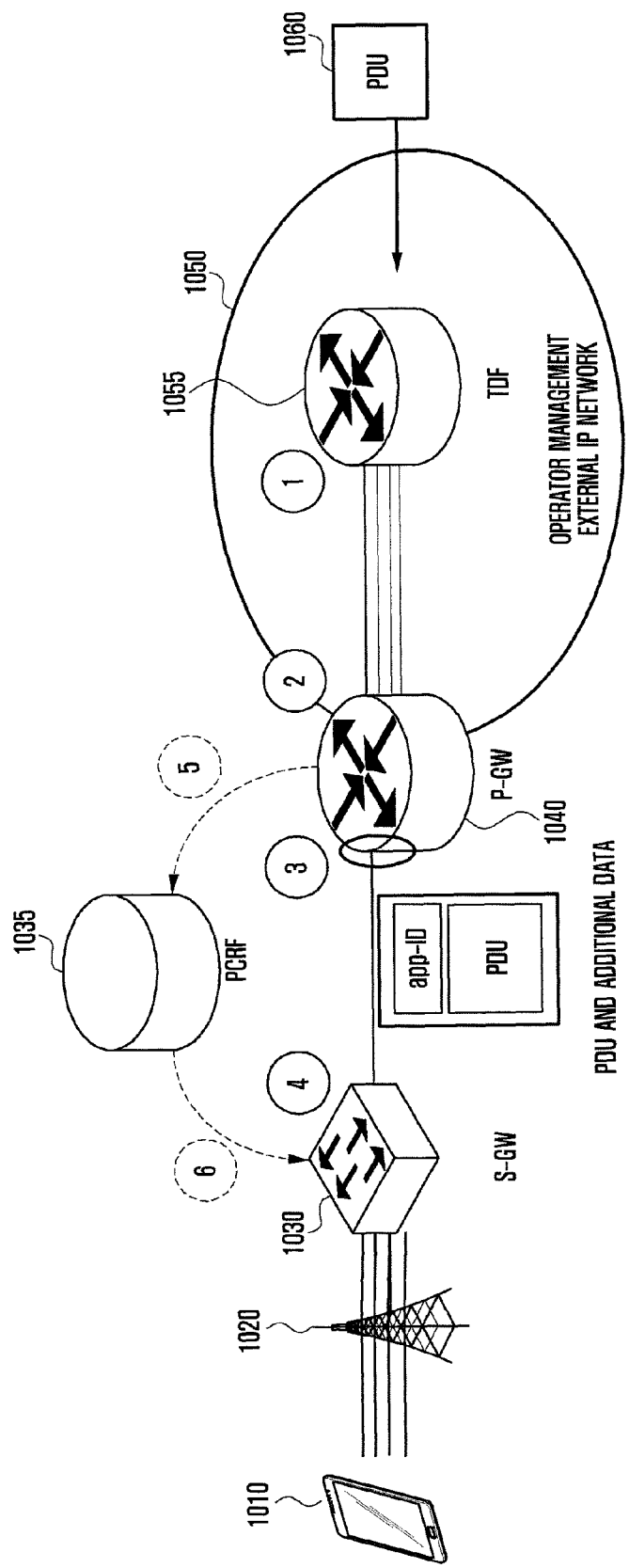
FIG. 10 is a diagram illustrating PMIP-based S5/S8 downlink in a communication system.

FIG. 10 is a diagram illustrating PMIP-based S5/S8 downlink in a communication system.

Referring to FIG. 10, the communication system includes at least one of a UE 1010, an evolved Node B (eNB) 1020, an S-GW 1030, a PCRF 1035, a P-GW 1040, and an Operator Managed External IP network 1050. The Operator Managed External IP network 1050 may include a TDF 1055. The communication system may forward the PDU 1060.

1-2. Charging may be needed for GTP-based S5/S8. This may be performed in a similar way as described with reference to FIG. 7.

3. The P-GW 1040 may add the application identifier associated with the PDU to the information transmitted to the S-GW 1030. Preferably, the P-GW 1020 may add the application identifier associated to the PDU to the GRE payload or the PIMPv6 header.

4. The S-GW 1030 may take an operation according to the application identifier associated with the PDU which is included in the GRE header or the PMIPv6 in the GRE decapsulation procedure or PMIPv6 header processing procedure. Here, a service class identifier may be added to the GTP-U header or an operation of mapping a specific bearer may be included.

5. The P-GW 1040 may send the PCRF 1035 the application identifier (App-ID) mapping information. Preferably, the application identifier mapping information may be transmitted from the PCEF (P-GW) to the PCRF via the Gx.

6. The PCRF 1035 may configure the application identifier mapping information to the BBERF (S-GW) 1030.

Figure 11:
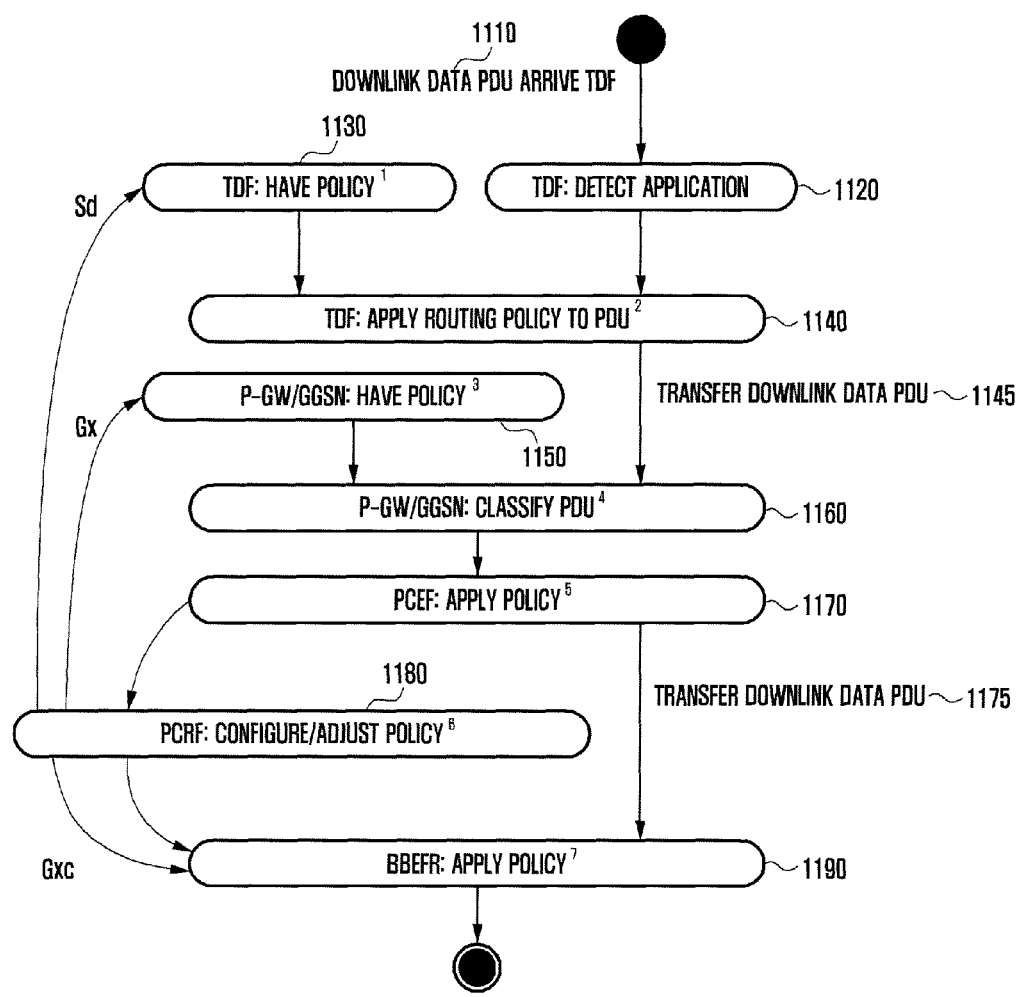
FIG. 11 is a diagram illustrating a data processing method according to an embodiment.

FIG. 11 is a diagram illustrating a data processing method according to an embodiment.

Referring to FIG. 11, steps 1110 to 1160 may be performed as described with reference to steps 810 to 860 of FIG. 8.

The PCEF may apply a policy based on the classified PDU at step 1170. With the exception that the GTP-U header cannot added by the PCEF on the S5/S8, the procedure may progress in the similar way to step 870 of FIG. 8. The bearer binding may be processed by the BBERF other than the PCEF. The enforcement that can be performed may include at least one of additional charging and gating (discarding the packet or delaying transmission of the packet or transferring the packet to another entity).

The PCEF may notify the S-GW (BBERF) of the application class of the PDU using the IP address of the S-GW when transferring the PDU to the S-GW (BBERF). It is also possible to transmit the application class information in the GRE header or the PMIPv6 header.

The downlink data PDU may be forwarded to the BBERF at step 1175.

The PCRF may configure or adjust the policy at step 1180. The PCRF may transmit the rules for determining how to interpret specific application classes (and virtual interfaces to activate) to the S-GW (BBERF). The S-GW (BBERF) may configure this information by itself. In an embodiment, the S-GW (BBERF) may configure this information through static configuration.

The S-GW (BBERF) may determine the policy at step 1190. The S-GW (BBERF) receives traffic from the PCEF and determines the application class of the PDU based on the received virtual address. Then the S-GW (BBERF) may configure the service class identifier marking and specific bearer binding strategy in the GTP-U header according to the enhanced QoS rules received from the PCRF.

In an embodiment, the uplink data may be transferred to the PCEF. According to an embodiment, the PCEF may be included in the P-GW.

In summary, the main concept of the embodiment is to classify the traffics into different classes based on the virtual address. That is, the network entities are preconfigured with the virtual addresses and traffics or services informations corresponding to the addresses, and the sending entity transmits the packet to the virtual address corresponding to the class of the traffic/service and the receiving entity identifies the traffic/service class based on the (virtual) address through which the packet is received. In the case of using this method, it is possible to reduce the processing load of each communication entity by negating extra operations of adding to and removing from the header of the packet.

The main concept of the embodiments of the present specification can be applied to other types of networks to split the classified traffics in a similar way. In an exemplary case of establishing a plurality of logical connections (that can carry different types of traffics) through a physical link between two network entities, the logical connections may be classified using virtual addresses of the receiving network entities.

In more detail, it may be required to transmit traffics belonging to different PDN connections through one link established between a UE and a radio access point (e.g. a link abiding by 802.11 standard in the case of using WLAN). In this case, the link established between the UE and the radio access point has no way of distinguishing among the data packets belonging to different PDN connections. In this situation, it is possible to allow for the recipient entity to identify the PDN connection to which the received data packet belongs by allocating different virtual addresses to the respective PDN connections and mapping the virtual addresses to the addresses of the data packets belonging to the respective PDN connections.

In more detail, the network entities may be the UE and the Trusted WLAN Access Gateway (TWAG) in an embodiment. The TWAG has per-Access Point Name (APN) virtual addresses to which PDN connections are actually established for use, and the mapping information thereof is preconfigured in the Wireless WLAN access point and the UE or may be transferred in the connection establishment procedure (e.g. EAP-based authentication procedure). The UE transmits a control message to the address of the TWAG corresponding to the destination based on the mapping information in requesting a specific APN for PDN connection such that the TWAG checks the APN to which the PDN connection is requested. After establishing the PDN connection, the packets belonging to the PDN connection are processed based on the virtual address of the TWAG. That is, when a downlink packet belonging to the PDN connection for the specific APN is transmitted, the TWAG sets the source address of the packet to the virtual address corresponding to the APN such that the UE recognizes the PDN connection to which the packet belongs. If an uplink packet occurs, the UE transmits the packet of which destination address is set to the virtual address of the TWAG corresponding to the PDN connection to which the packet belongs to (i.e. specific APN) such that the TWAG recognize the PDN connection to which the packet belongs.

It is to be appreciated that those skilled in the art can change or modify the embodiments without departing the technical concept of this specification. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method of a terminal in a communication system, the method comprising:
transmitting, to a wireless local network (WLAN), a request message related to a packet data network(PDN) connection;
receiving, from the WLAN, a response message in response to the request message, the response message including an identifier(ID) corresponding to the PDN connection; and
transmitting, to the WLAN, a user plane traffic related to the PDN connection based on the received ID,
wherein the PDN connection is identified within a WLAN access gateway based on information on a bearer associated with the PDN connection and information related to the terminal.

2. The method of claim 1, wherein the ID corresponding to the PDN connection is a media access control(MAC) address related to the WLAN.

3. The method of claim 2, wherein the MAC address related to the WLAN is a MAC address of the WLAN access gateway.

4. The method of claim 1, wherein the ID corresponding to the PDN connection is assigned for the PDN connection and used to identify a link associated with the PDN connection between the terminal and the WLAN access gateway.

5. A method of a wireless local network (WLAN), the method comprising:
receiving, from a terminal, a request message related to a packet data network(PDN) connection;
transmitting, to the terminal, a response message in response to the request message, the response message including an identifier(ID) corresponding to the PDN connection; and
receiving, from the terminal, a user plane traffic related to the PDN connection based on the received ID,
wherein the PDN connection is identified within a WLAN access gateway based on information on a bearer associated with the PDN connection and information related to the terminal.

6. The method of claim 5, wherein the ID corresponding to the PDN connection is a media access control(MAC) address related to the WLAN.

7. The method of claim 6, wherein the MAC address related to the WLAN is a MAC address of the WLAN access gateway.

8. The method of claim 5, wherein the ID corresponding to the PDN connection is assigned for the PDN connection and used to identify a link associated with the PDN connection between the terminal and the WLAN access gateway.

9. A terminal of a mobile communication system, the terminal comprising:
a transceiver for transmitting and receiving a signal; and
a controller configured to:
transmit, to a wireless local network(WLAN), a request message related to a packet data network(PDN) connection,
receive, from the WLAN, a response message in response to the request message, the response message including an identifier(ID) corresponding to the PDN connection, and
transmit, to the WLAN, a user plane traffic related to the PDN connection based on the received ID,
wherein the PDN connection is identified within a WLAN access gateway based on information on a bearer associated with the PDN connection and information related to the terminal.

10. The terminal of claim 9, wherein the ID corresponding to the PDN connection is a media access control(MAC) address related to the WLAN.

11. The terminal of claim 10, wherein the MAC address related to the WLAN is a MAC address of the WLAN access gateway.

12. The terminal of claim 9, wherein the ID corresponding to the PDN connection is assigned for the PDN connection and used to identify a link associated with the PDN connection between the terminal and the WLAN access gateway.

13. A wireless local network (WLAN) of a communication system, the WLAN comprising:
a transceiver for transmitting and receiving a signal; and
a controller configured to:
receive, from a terminal, a request message related to a packet data network(PDN) connection, transmit, to the terminal, a response message in response to the request message, the response message including an identifier(ID) corresponding to the PDN connection, and receive, from the terminal, a user plane traffic related to the PDN connection based on the received ID, wherein the PDN connection is identified within a WLAN access gateway based on information on a bearer associated with the PDN connection and information related to the terminal.

14. The WLAN of claim 13, wherein the ID corresponding to the PDN connection is a media access control(MAC) address related to the WLAN.

15. The WLAN of claim 14, wherein the MAC address relate to the WLAN is a MAC address of the WLAN access gateway.

16. The WLAN of claim 13, wherein the ID corresponding to the PDN connection is assigned for the PDN connection and used to identify a link associated with the PDN connection between the terminal and the WLAN access gateway.

* * * * *